United States Patent [19]
Hedgecoth

[11] Patent Number: 5,460,757
[45] Date of Patent: Oct. 24, 1995

[54] METHOD FOR MANUFACTURING PRE-INKED STAMPS

[75] Inventor: David L. Hedgecoth, Silver Point, Tenn.

[73] Assignee: TopStamp, Inc., Silver Point, Tenn.

[21] Appl. No.: 174,716

[22] Filed: Dec. 29, 1993

[51] Int. Cl.⁶ .............................. B29B 13/04; B29C 35/08
[52] U.S. Cl. ............... 264/400; 219/121.69; 219/121.73; 264/28; 264/138; 264/482; 364/474.08; 425/174.4
[58] Field of Search .......................... 219/121.67, 121.71, 219/121.72, 121.69, 121.73; 264/22, 25, 152, 138, 162, 28; 435/174.4; 364/474.08

[56] References Cited

U.S. PATENT DOCUMENTS

| | | |
|---|---|---|
| 2,777,824 | 1/1957 | Leeds. |
| 3,055,297 | 9/1962 | Leeds ...................................... 101/327 |
| 3,170,008 | 2/1965 | Levine ...................................... 264/22 |
| 3,549,733 | 12/1970 | Caddell ...................................... 264/25 |
| 3,679,863 | 7/1972 | Houldcroft et al. . |
| 3,870,852 | 3/1975 | Kogert . |
| 3,991,145 | 11/1976 | Landsman ............................... 264/25 |
| 3,999,918 | 12/1976 | Landsman ............................ 425/174.4 |
| 4,000,243 | 12/1976 | Curren ...................................... 264/293 |
| 4,002,877 | 1/1977 | Banas . |
| 4,125,757 | 11/1978 | Ross . |
| 4,403,134 | 9/1983 | Klingel . |
| 4,575,330 | 3/1986 | Hull ............................................ 264/22 |
| 4,740,258 | 4/1988 | Breitscheidel ........................... 156/209 |
| 4,851,061 | 7/1989 | Sorkoram ............................ 219/121.72 |
| 5,071,597 | 12/1991 | D'Amato et al. ........................... 264/22 |

FOREIGN PATENT DOCUMENTS 3939374 6/1991 Germany ................................. 264/28

*Primary Examiner*—Mathieu D. Vargot
*Attorney, Agent, or Firm*—Pitts & Brittian

[57] ABSTRACT

The method (10) of the present invention includes a first step of designing an image to be reproduced by the stamp pad (12). A pre-inked rubber material (14) derived from an ink and plasticizer premix is then super-cooled to immobilize the ink constituents (28) and harden the pre-inked material (14). A controller (52) then processes the information communicated from the computer (50) in order to control the operation of an engraver (54) such as a laser beam generator or a pantograph. The engraved material (12) is then warmed to room temperature and affixed to an appropriate handle. Alternatively, the selected image (38) is accomplished on the top surface of the stamp pad (12) during the curing procedure. In this procedure, the premix material (22) is heated from the bottom surface (30) to a curing temperature up to a selected height. A heat source (62) is applied to the image surface (18) such as to raise the material directly below to an appropriate curing temperature level to a selected depth.

19 Claims, 3 Drawing Sheets

METHOD FOR MANUFACTURING PRE-INKED STAMPS

TECHNICAL FIELD

This invention relates to the field of pre-inked stamps. More specifically, this invention relates to manufacturing pre-inked stamps in a manner such as to reduce time and expense associated therewith.

BACKGROUND ART

In the field of rubber stamps, it is now well known that stamp pads may be fabricated from a pre-inked rubber material. These pre-inked stamps may be used in lieu of conventional stamps which must first be inked, such as by stamping them on an ink pad, before duplicating an image on a selected object.

Typically, pre-inked stamps are manufactured using several steps. First, the image to be duplicated by the stamp is prepared using a selected computer software program, typesetting, or other selected method. After the art is camera-ready, a photograph is taken and a negative is made. The negative is then placed over a photopolymer plate, after which an ultraviolet light is impinged upon the negative. The ultraviolet light serves to cure the polymer. Any uncured resin is washed away in a washout unit.

The photopolymer plate is then used to fabricate a matrix board. This process involves placing the photopolymer plate face down on the matrix board, the photopolymer plate then being driven into the board. In order to accomplish this task, the entire assembly is preheated. The matrix board is then locked into a frame designed to hold a liquid pre-inked stamp gel and pre-mix. The liquid is then heated in a press for a selected time, typically eight (8) to twenty-four (24) minutes, at a selected temperature, typically 238° F. to 275° F.

It is well known that the steps of preparing the artwork in camera-ready format, making the negative, making the photopolymer plate, and making the matrix board account for more than half of the materials and two-thirds of the labor used in manufacturing the pre-inked stamps. It is also well-known that these materials are typically thrown away after the particular stamp is made because they are then useless. Further, it is well known that the process of curing the photopolymer plate using ultraviolet light is both expensive and has a negative impact on the environment.

Several different methods have been developed to achieve the basic results of the above-described process of manufacturing pre-inked stamps. Typical of the art are those devices and methods disclosed in the following United States Letters Patents:

| U.S Pat. No. | Inventor(s) | Issue Date |
|---|---|---|
| 3,991,145 | R. M. Landsman | Nov 9, 1976 |
| 3,999,918 | R. M. Landsman | Dec 28, 1976 |
| 4,000,243 | R. A. Curren | Dec 28, 1976 |

Of these patents, the Landsman patents ('145 and '918) teach a method and apparatus, respectively, for making a printing plate from a porous substrate. The Landsman printing plate may be fabricated from polypropylene or nylon and is fabricated in much the same manner as the photopolymer plate described above.

The Curren patent ('243) describes a method for manufacturing pre-inked stamps wherein a thermoplastic material is compressed against a die, after which heat is applied thereto in order to cause the thermoplastic material to retain a memory of the die impressions. This is similar to the fabrication of the matrix board as described above.

Other methods have been developed for fabrication of various products such as rubber, wood, paper, foam, or other sheet materials. Typical of the art are those devices and methods disclosed in the following United States Letters Patents:

| U.S Pat. No. | Inventor(s) | Issue Date |
|---|---|---|
| 3,679,863 | P. T. Houldcroft, et al. | Jul 25, 1972 |
| 3,870,852 | H. Kogert | Mar 11, 1975 |
| 4,002,877 | C. M. Banas | Jan 11, 1977 |
| 4,125,757 | W. A. Ross | Nov 14, 1978 |
| 4,403,134 | H. Klingel | Sep 6, 1983 |
| 4,740,258 | H. U. Breitscheidel | Apr 26, 1988 |

Of these patents, Houldcroft, et al. ('863), teach an apparatus for cutting paper, timber, and fabric using a laser beam. A jet of air or other inert gas carrying an atomized stream of liquid coolant is directed onto the workpiece at the point at which the laser beam is concentrated in order to reduce the spread of charring or tar deposit from the cut along the surfaces of the workpiece. Houldcroft, et al., do not teach the use of similar methods in the field of rubber stamps, as the present field present problems totally unlike those in the field of cutting wood and wood products.

Kogert ('852) discloses a process and apparatus for simultaneously cutting two dissimilar materials such as rubberized wire comprising a metal wire filament having a rubberized covering.

Banas ('877) teaches a method of cutting a multi-layer pile of sheet material with a laser beam. In a fashion similar to the Houldcroft, et al. disclosure above, a stream of liquid coolant is directed toward the material at the location of the laser beam impingement, in this case in order to prevent adhesion of the adjacent layers of material, globularization, or singeing.

Ross ('757) teaches a method of cutting a thermally conductive workpiece using a laser beam wherein the workpiece is submerged into a liquid coolant. The laser beam used by Ross is a Carbon Dioxide laser beam which is described as being capable of vaporizing almost any substance known. In the present invention where a liquid ink is contained within a rubber stamp pad, it will be seen that this type of laser beam would be destructive in the manufacturing of the image upon the stamp pad.

The Klingel ('134) patent discloses a method for cutting a workpiece using a laser beam in conjunction with a stream of liquid coolant. The liquid coolant is directed at the workpiece such as to intersect the laser beam at the point of contact on the workpiece. This type of coolant system is provided in order to maintain a heat zone at a satisfactory temperature. The Klingel method is particularly intended for cutting sheet metals where a problem arises when the material evaporates, thus leaving a wide gap between the two pieces which have been cut apart from each other.

Breitscheidel ('258) teaches a method for embossing flexible sheets of foam material. The method incorporates the use of a continuous loop metallic embossing belt. This method does not teach a means for cutting or etching the rubber to the selected depth in order to create a selected pattern such as that on the face of a rubber stamp.

Although several of the prior art patents disclose methods for cutting selected materials using a laser beam while using a selected liquid coolant, none teaches a method for cutting or etching the surface of a pre-inked rubber pad such as used in stamps. The pre-inked rubber material presents problems not inherent in materials such as those described in the prior art patents such as wood, metal, and paper. Namely, the liquid ink which is contained within the pores of the rubber dissipates heat throughout the material. When a sufficient temperature is reached in order to cut the rubber, the ink has been heated beyond a degree at which it will be usable again. Therefore, even though the rubber may be cut using the methods of the prior art patents, the ink would be rendered useless.

If the gel material containing the ink is overcured, it develops plastic qualities which allow the ink to flow freely until the material is completely dry. Conversely, if the gel is undercured, it will tear apart easily.

Therefore, it is an object of this invention to provide a means for manufacturing pre-inked stamps using laser technology.

Further, it is an object of the present invention to provide a means for manufacturing pre-inked stamps wherein the stamps may be cooled consistently throughout to a temperature at which laser technology may be used to accurately cut or etch the surface of the pad without allowing the ink to dissipate the heat generated by the laser.

Accordingly, it is also an object to provide such a means for manufacturing pre-inked stamps wherein the ink is cooled to a temperature which is not detrimental to the printing qualities of the ink when warmed to room temperature, or to a temperature at which the ink is to be applied.

DISCLOSURE OF THE INVENTION

Other objects and advantages will be accomplished by the present invention which serves to simplify the process of manufacturing pre-inked stamps. Moreover, in the preferred embodiment the method is designed to reduce the time and expense of manufacturing pre-inked stamps by obviating the need for many of the intermediate steps involved in conventional manufacturing methods.

The method of the present invention includes several steps. The first of these steps is to design the image to be reproduced by the stamp pad. The design step is performed on a conventional computer using any suitable computer software program capable of yielding the selected results. The image data is routed to a controller in much the same way that information is communicated to a printer.

The pre-inked material used in the present method to manufacture a pre-inked stamp pad is super-cooled to a selected temperature in order to stabilize the ink constituents and harden the pre-inked material. The material may be cooled to within a range of approximately 0° F. to −275° F. The material may be super-cooled using liquid $CO_2$, liquid nitrogen, or refrigeration techniques.

When super-cooled and thus immobilized, the ink is substantially incapable of dissipating heat. The pre-inked material being solidified is capable of being cut or engraved. The controller then processes the information communicated from the computer in order to control the operation of an engraver, which may be a laser beam generator, a pantograph, or any other conventional engraver, cutter, or router. The controller communicates with the engraver in order to control the exact location of the impingement of the laser beam, engraving tool, or other etching device upon the stamp pad. Specifically, the engraver is continuously passed over the material to be removed until the selected depth of removal has been achieved.

After all of the information delivered from the computer regarding the image has been processed by the controller, and the engraver has performed its required functions, the stamp pad defines an upper surface having a configuration defining a mirror image of the selected image designed by the user on the computer. The stamp pad is then warmed to room temperature and affixed to an appropriate handle, unless already so affixed. When used, the stamp pad will leave a print substantially similar to the selected image.

In an alternate method, the selected image is accomplished on the top surface of the stamp pad during the curing procedure. In this procedure, the premix material is heated from the bottom surface to an appropriate curing temperature. Sufficient heat is applied to raise the temperature of the premix material to the curing temperature up to a selected height, typically about two-thirds the total height of the premix material. A heat source is then applied to the image surface such as to raise the material directly below the image surface to the appropriate curing temperature level. The heat source applied to the image surface is sufficient to cure the premix material to a depth such as to insure that the premix material is cured throughout and immediately below the image surface to a typical depth of approximately one-third the height of the premix material.

The material in the top one-third of the premix not directly below the image surface is washed away in a bath consisting of premix material, thus reclaiming the unused material. The heat source may be a laser beam as used in the previous embodiment to cut or engrave the selected image onto the stamp pad. The laser beam would be continuously passed over the image surface in order to heat the same until the desired curing has been accomplished.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A method for manufacturing pre-inked stamps incorporating various features of the present invention is schematically illustrated generally at 10 in the figures. The method for manufacturing pre-inked stamps, or method 10 is designed for simplifying the process of manufacturing pre-inked stamps 12. Moreover, in the preferred embodiment the method 10 is designed to reduce the time and expense of manufacturing pre-inked stamps 12 by obviating the need for many of the intermediate steps involved in conventional manufacturing methods.

Figure 1:
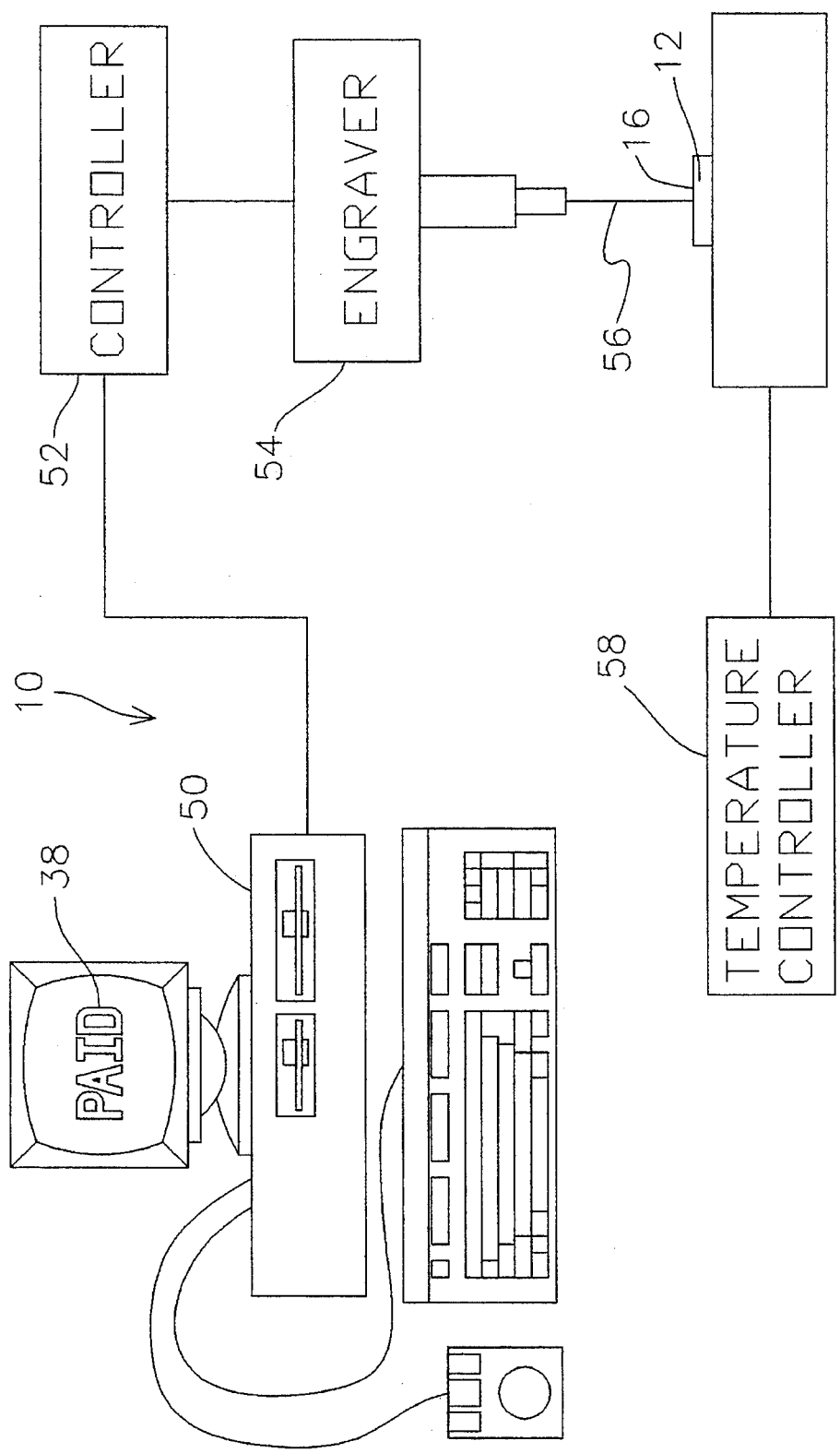
FIG. 1 is a schematic block diagram illustrating one preferred embodiment of the method for manufacturing pre-inked stamps of the present invention.

As illustrated in FIG. 1, the method 10 of the present invention includes several steps. The first of these steps is the design of the image 38 to be reproduced by the stamp pad 12. The design step is accomplished in a manner such that the image 38 can be communicated to an electrically-operated controller 52. As illustrated, the image 38 may be designed using any conventional computer 50 with a suitable software program capable of accomplishing the selected results. The image 38 is communicated to the controller 52 in much the same way that information is communicated to a printer.

The controller 52 processes the information communicated from the computer 50 in order to control the operation of a selected engraving device 54. The selected engraver 54 may be a laser beam generator as illustrated, or may be any other conventional engraver 54 such as a pantograph or a router. The controller 52 communicates with the engraver 54 in order to control the exact location of the impingement of the laser beam 56 or other etching, cutting, or routing device upon the pre-inked material 14.

After all of the information delivered from the computer 50 regarding the image 38 has been processed by the controller 52, and the engraver 54 has performed its required functions, the stamp pad 12 defines an upper surface 16 having a configuration defining a mirror image 38' of the selected image 38 designed by the user on the computer 50. Thus, when used, the stamp pad 12 will leave a print substantially similar to the selected image 38.

The process of manufacturing pre-inked rubber 14 for use in stamp pads 12 has several considerations which must be taken into account when engraving or etching the same. The particular material suitable for use in the present invention is originated in a liquid premix 22 comprised of plastic particulates, or a plasticizer, and ink. The liquid premix is cured at a selected temperature. For example, one premix 22 cures at a temperature of approximately 250° F. For ease of discussion, this particular example will be used. However, it will be understood that other premixes 22 may be used as well, with each different premix 22 potentially being cured at a different temperature.

During the curing process, the premix material 22 goes through several stages. During the initial heating stage, the premix material 22 becomes very liquid, and then begins to gel into a thick consistency. When in the thicker state, the individual particles begin to adhere to each other at their perimeters to form a sintered mass 24. Voids 26 between the individual particles are filled with ink droplets 28. After the curing process has been completed, the material is cooled to room temperature and yields the pre-inked material 14 used in the present method 10.

When heated such as in engraving or cutting processes, the ink constituents within the pre-inked material tend to conduct the heat such that the heat is dissipated throughout the material 14. Vaporization at the point of contact of the cutting or engraving source 54 becomes difficult due to the heat dissipation. A typical result is the overcuring of the material 14 at the point of contact of the cutting or engraving source 54. Thus, a hard, raised bead of plastic forms which does not print and further hinders the printing ability of proximate areas of the pre-inked material as well. This yields unacceptable results.

In order to overcome the problems of the prior art, the pre-inked material used in the present method 10 is selected such that it may be super-cooled to a selected temperature and then warmed to room temperature without sufficient damage to the ink or plastic comprising the pre-inked material 14 and without damaging the printing characteristics of the stamp pad 12. For example, the material 14 may be cooled to approximately −60° F. Again, this temperature is merely exemplary and is not intended to limit the present invention to that temperature. One material 14 suitable for use in accordance with the method 10 of the present invention may be cooled to a temperature within the approximate range of −50° F. to −275° F. Several methods may be used to super-cool the pre-inked material 14, including the use of liquid $CO_2$, liquid nitrogen, and refrigeration. The selected method of super-cooling the pre-inked material 14 is performed during the temperature control step of the present method 10 by the temperature controller 58.

When super-cooled, the ink 28 is immobilized and substantially incapable of dissipating heat. The pre-inked material 14 is then solidified and capable of being cut or engraved. Thus, after the material 14 has been super-cooled, the operator may perform the steps above to ultimately control the engraver 54 to produce a mirror image 38' of the selected image 38 on the top face 16 of the stamp pad 12. Specifically, the engraver 54 is continuously passed over the material 14 to be removed until the selected depth of removal has been achieved. After the mirror image 38' has been produced, the stamp pad 12 may be warmed to room temperature. The stamp pad 12 is then affixed to an appropriate handle (not shown), unless already so affixed, and is then ready for use.

Figure 2:
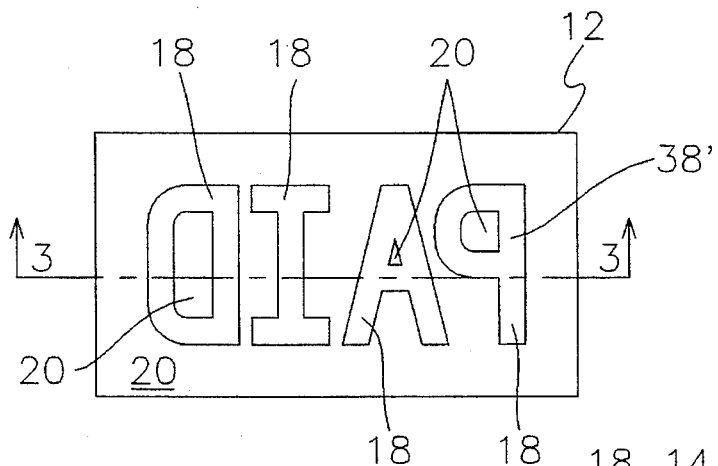
FIG. 2 illustrates a top elevation view of a stamp pad indicating a selected image to be engraved thereon.
Figure 3:
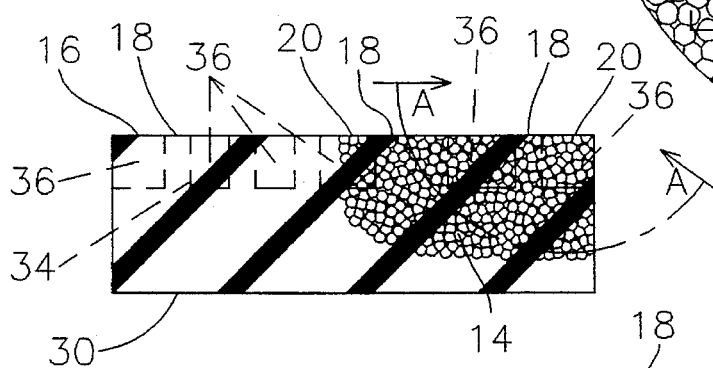
FIG. 3 is a side elevation view, in section, of the stamp pad illustrated in FIG. 2, taken along 3—3.
Figure 3A:
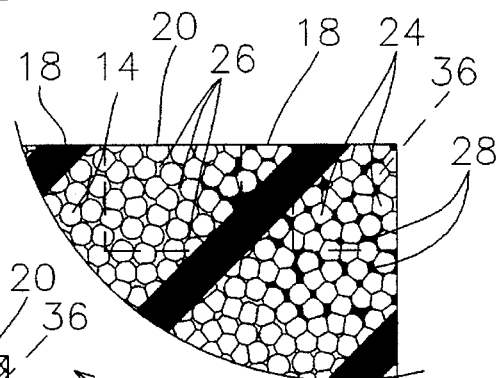
FIG. 3A is an enlarged view of a portion of the stamp pad illustrated in FIG. 3.
Figure 4:
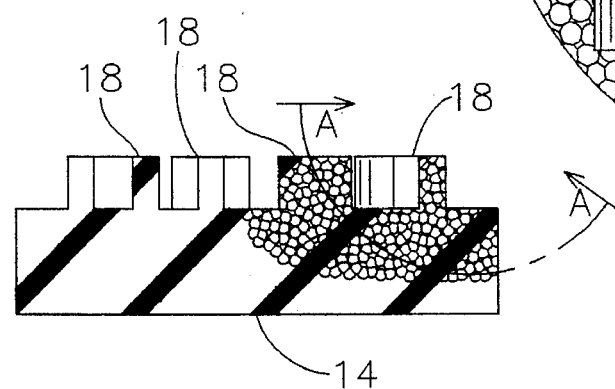
FIG. 4 illustrates the side elevational view of FIG. 3 after the method of manufacturing pre-inked stamps of the present invention has been performed.
Figure 4A:
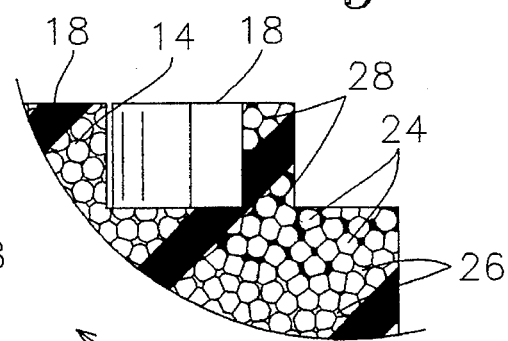
FIG. 4A is an enlarged view of a portion of the stamp pad illustrated in FIG. 4.

FIG. 2 illustrates the mirror image 38' of a selected image 38 to be reproducible by the stamp pad 12 of the present invention. FIGS. 3 and 3A illustrate the locations and depth of cut 34 desired at one cross section to accomplish the mirror image 38' shown in FIG. 2. FIGS. 4 and 4A illustrate the same cross as shown in FIGS. 3 and 3A after the selected cuts 34 have been made. FIGS. 3A and 4A more clearly illustrate the structure of the sintered mass 24 and the ink 28 which comprise the stamp pad 12 of the present invention.

As illustrated, the top surface 16 of the pre-inked material 14 used to fabricate the stamp pad 12 is defined by the image surface 18 and the surface 20 to be removed, or removed surface. In the embodiments disclosed, the surface 20 to be removed is cut or engraved away by a laser 56 or a pantograph. Any other conventional methods of cutting or engraving may be employed as well. It is also conceivable that the mirror image 38' may be cut through the entire depth of the pre-inked material 14, the mirror image 38' then being mounted upon an acceptable base.

Figure 5:
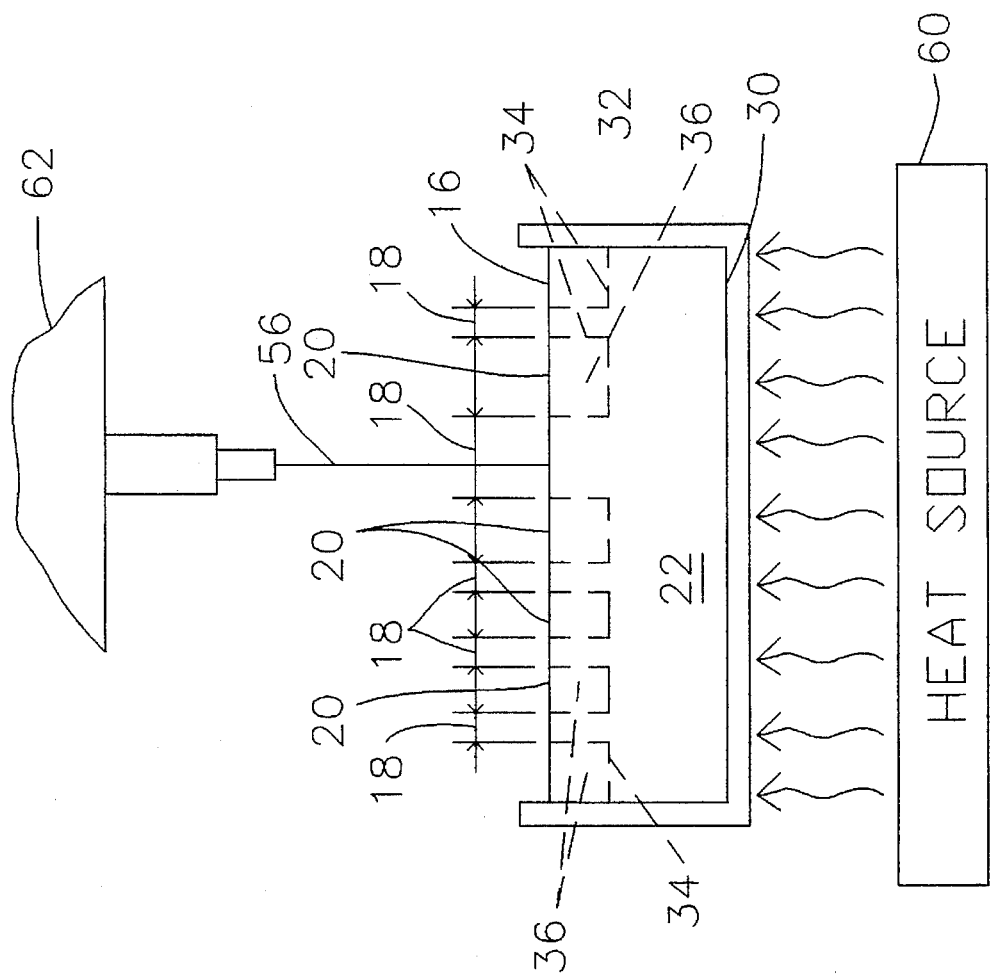
FIG. 5 illustrates an alternate embodiment of the method of manufacturing pre-inked stamps of the present invention.

In an alternate method illustrated in FIG. 5, the mirror image 38' is accomplished on the top surface 16 of the stamp pad 12 during the curing procedure. In this procedure, the premix material 22 is contained in a substantially flat and level container 32 to achieve a consistent depth throughout. A heat source 60 is then applied to the bottom surface 30 of the premix material 22 and heated to an appropriate curing temperature. Sufficient heat is applied to raise the temperature of the premix material 22 to the curing temperature up to a selected height. As shown, one preferred height is approximately two-thirds the height of the premix material 22. Thus, the heat source 60 will not cure the material 22 above that height.

A heat source 62 is then applied to the image surface 18 such as to raise the material 22 directly below the image surface 18 to the appropriate curing temperature level. The heat source 62 applied to the image surface 18 is sufficient to cure the premix material 22 to a depth such as to insure that the premix material 22 is cured throughout and immediately below the image surface 18. Thus, in the above example, the heat source 62 applied to the image surface 18 is sufficient to cure the premix material 22 to a depth of approximately one-third the height of the premix material 22.

The material 22 in the areas 36 to be removed is not heated to a temperature sufficient to cure the same. Therefore, after the bottom portion 30 and image surface 18 of the stamp pad 12 are cured such that they form a unitary embodiment, the areas 36 to be removed will remain in a liquid state. The material 22 in the areas 36 to be removed is then washed in an ink and plasticizer bath, the ink and plasticizer being the same material 22 as used to fabricate the pre-inked stamp pad 12. The remaining product after the washing is the stamp pad 12 bearing a mirror image 38' of the selected image 38 thereon.

As illustrated, the heat source 62 may be a laser beam 56 as used in the previous embodiment to cut or engrave the mirror image 38' onto the stamp pad 14. The laser beam 56 would be continuously passed over the image surface 18 in order to heat the same until the desired curing has been accomplished. It will be understood that other heat sources 62 may alternatively be employed.

Of course, it will be seen that the methods of the present invention as described may be performed to produced a single pre-inked stamp pad 12 or to produce a plurality of pre-inked stamp pads 12 simultaneously. When a plurality of stamp pads 12 are manufactured together, and after the selected mirror images 38' are engraved or cut from the top surfaces 16 thereof, the individual stamp pads 12 are separated one from another in any conventional fashion. In the method wherein the stamp pad material 14 is super-cooled, the individual stamp pads 12 may be separated while in the super-cooled state or after being warmed to room temperature.

From the foregoing description, it will be recognized by those skilled in the art that a method for manufacturing pre-inked stamps offering advantages over the prior art has been provided. Specifically, the method of the present invention provides a means for manufacturing stamps used to reproduce selected images, the stamps being fabricated from pre-inked material. The method of the present invention offers advantages over the prior art such as a reduction in the time required, a reduction in the amount of materials used and wasted, and a reduction in the overall cost of the finished product.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A method for manufacturing a pre-inked stamp, said method comprising the steps of:
   creating an image, said image being associated with a set of electronic data;
   conditioning a workpiece to a non-ambient temperature, said workpiece including at least an ink constituent and a base material;
   sending said set of electronic data to a controller;
   processing said set of electronic data by said controller; and
   forming a mirror image of said image on a top surface of said workpiece by a device controlled by said controller.

2. The method of claim 1 wherein said non-ambient temperature is below a freezing point of said ink constituent, said workpiece comprising a cured material.

3. The method of claim 2 wherein said step of forming said mirror image of said image on said top surface of said workpiece is performed by etching.

4. The method of claim 3 wherein said device is a laser beam generator.

5. The method of claim 3 wherein said device is a pantograph.

6. The method of claim 3 wherein said device is a computer controlled engraver.

7. The method of claim 2 wherein said step of forming said mirror image of said image on said top surface of said workpiece is performed by cutting.

8. The method of claim 7 wherein said device is a laser beam generator.

9. A method for manufacturing a pre-inked stamp, said method comprising the steps of:
   creating an image, said image being associated with a set of electronic data;
   conditioning a workpiece to a non-ambient temperature, said workpiece including at least an ink constituent and a base material, said non-ambient temperature being below a freezing point of said ink constituent, said workpiece comprising a cured material;
   sending said set of electronic data to a controller;
   processing said set of electronic data by said controller; and
   forming a mirror image of said image on a top surface of said workpiece by a device controlled by said controller.

10. The method of claim 13 wherein said step of forming said mirror image of said image on said top surface of said workpiece is performed by etching.

11. The method of claim 10 wherein said device is a laser beam generator.

12. The method of claim 9 wherein said device is a pantograph.

13. The method of claim 9 wherein said step of forming said mirror image of said image on said top surface of said workpiece is performed by cutting.

14. The method of claim 13 wherein said device is a laser beam generator.

15. A method for manufacturing a pre-inked stamp, said method comprising the steps of:
   creating an image, said image being associated with a set of electronic data;
   conditioning a workpiece to a non-ambient temperature, said workpiece including at least an ink constituent and a base material, said non-ambient temperature being a curing temperature of said workpiece, said workpiece initially being substantially uncured;
   sending said set of electronic data to a controller;
   processing said set of electronic data by said controller;
   forming a mirror image of said image on a top surface of said workpiece by a device controlled by said controller, said step of forming said mirror image of said image on said top surface of said workpiece being performed by applying a first heat source to a bottom surface of said workpiece and applying a second heat source to said top surface proximate said mirror image, said first heat source achieving said curing temperature throughout a portion of said workpiece from said bottom surface to a depth of said workpiece, said second heat source achieving said curing temperature throughout said workpiece immediately below said mirror image and extending at least to said depth such as to form a cured portion, said cured portion comprising said pre-inked stamp, remaining portions of said workpiece being above said depth and not immediately below said mirror image being substantially uncured, said second heat source comprising a laser beam generator; and washing said remaining portion of said workpiece from said cured portion.

16. A method for manufacturing a pre-inked stamp, said method comprising the steps of:

creating an image, said image being associated with a set of electronic data;

conditioning a workpiece to a non-ambient temperature, said non-ambient temperature being a curing temperature of said workpiece, said workpiece initially being substantially uncured, said workpiece including at least an ink constituent and a base material;

sending said set of electronic data to a controller;

processing said set of electronic data by said controller; and forming a mirror image of said image on a top surface of said workpiece by a device controlled by said controller.

17. The method of claim 16 wherein said step of forming said mirror image of said image on said top surface of said workpiece is performed by applying a first heat source to a bottom surface of said workpiece and applying a second heat source to said top surface proximate said mirror image, said first heat source achieving said curing temperature throughout a portion of said workpiece from said bottom surface to a depth of said workpiece, said second heat source achieving said curing temperature throughout said workpiece immediately below said mirror image and extending at least to said depth such as to form a cured portion, said cured portion comprising said pre-inked stamp, remaining portions of said workpiece being above said depth and not immediately below said mirror image being substantially uncured.

18. The method of claim 17, after said step of forming said mirror image of said image on said top surface of said workpiece, further comprising the step of washing said remaining portion of said workpiece from said cured portion.

19. The method of claim 17 wherein said second heat source is a laser beam generator.

* * * * *